Jan. 13, 1959   R. C. DU BOIS   2,868,018
RING BALANCE FOR MEASURING PRESSURE DIFFERENCES
Filed July 22, 1954
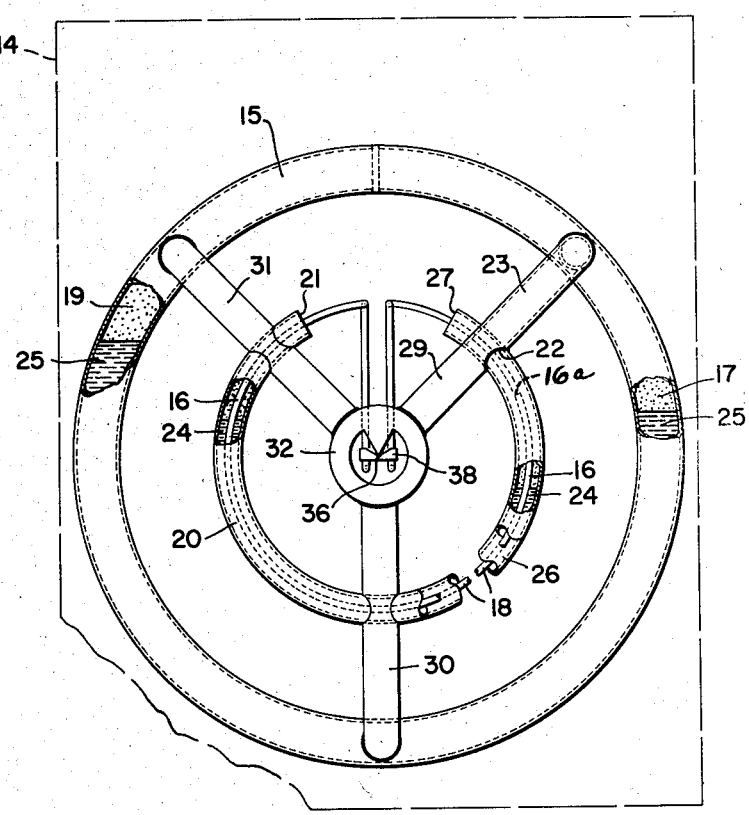
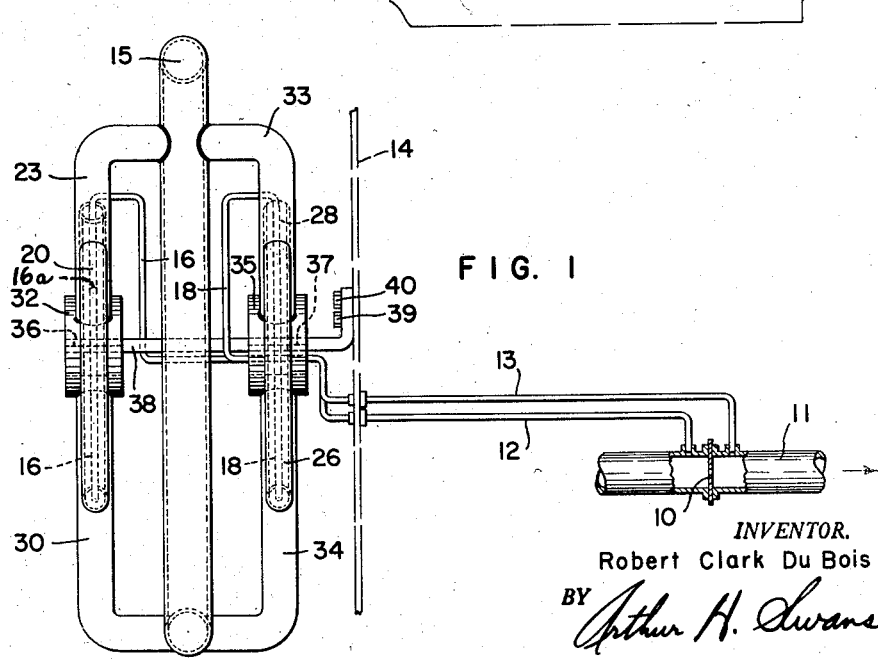
INVENTOR.
Robert Clark Du Bois
BY Arthur H. Swanson
ATTORNEY.

United States Patent Office 2,868,018
Patented Jan. 13, 1959

2,868,018

RING BALANCE FOR MEASURING PRESSURE DIFFERENCES

Robert Clark Du Bois, Fairfield, Conn., assignor to Minneapolis-Honeywell Regulator Company, Minneapolis, Minn., a corporation of Delaware Application July 22, 1954, Serial No. 445,109

6 Claims. (Cl. 73—405)

A general object of the present invention is to provide improvements in differential pressure measuring gauges contributing to improved accuracy and performance. The invention was devised for and is well suited for transmitting the static pressures, existing on the opposite sides of an orifice placed in a flow line, to a tilting mechanism such as a ring balance wherein the angular deflection of such a mechanism is a measure of the difference between the static pressures.

It is well known that in such mechanisms the angular deflections are representative of the rate of flow in the flow line. In ring balance flow meter mechanisms and other similar tilting mechanisms it has been a common practice in the prior art to employ flexible connections between each of the aforesaid static pressure connections and the ring balance in order that the balance ring may be rotated with said connections. This notwithstanding the fact that workers in the prior art have recognized certain drawbacks inherent in such pressure connections which tend to interfere with the free movement of the ring in response to changes in the applied pressures. Specifically, in such flexible connections employed to transmit pressures to a ring balance, wherein the inherent stiffness of the said connections introduces a resilient loading effect which is detrimental to a true measurement of the aforesaid angular deflection.

A more specific object of this invention is therefore to provide a static pressure connection for a ring balance whose accuracy is not limited to the stiffness of the static pressure connection attached thereto.

Another object is to provide improvements in a ring balance differential pressure gauge in which the high and low pressures are applied to the gauge through individual liquid seals which introduce little or no friction or detent action on the ring balance.

A still more specific object of the invention is to so arrange the liquid seals that the forces created by motion of the sealing liquid tend to supplement the deflection of the ring resulting from a change in the applied pressures, and thereby increase the sensitivity of the gauge.

The various features of novelty which characterize this invention are pointed out with particularity in the claims annexed to and forming a part of this specification. For a better understanding of the invention, however, its advantages and specific objects obtained with its use, reference should be made to the accompanying drawings and descriptive matter in which is illustrated and described a preferred embodiment of the invention.

In the drawings:

Fig. 1 is a side elevation showing the improved differential pressure transmitting connections between the opposite sides of an orifice in a flow line and a tiltable ring balance type differential pressure measuring gauge; and Fig. 2 is a front elevation showing how the improved differential pressure connections shown in Fig. 1 are connected through a fluid seal to the high and low pressure chambers of the tiltable differential gauge.

The selected form of the invention which is diagrammatically illustrated in Fig. 1, shows the pressure connections described supra and being made use of in a ring balance apparatus for measuring and indicating a fluid flow. In the operation of this apparatus the pressure at the high and low sides of an orifice plate 10 in a conduit 11, which differs from one another due to a flow of fluid through the conduit in the direction of the arrow, is transmitted respectively by conduits 12 and 13 to the back of a casing 14 enclosing and supporting a ring balance 15. In this preferred arrangement an open ended first stationary supply tube 16, is used to connect the high pressure fluid in a conduit 12 to the high pressure chamber 17 of a ring balance 15. The open end of this high pressure supply tube is shown terminating at 16a in Figs. 1 and 2 of the drawing. A second stationary supply tube 18 is used to connect the low pressure fluid in conduit 13 to the low pressure chamber 19 of the ring balance 15. This tube 18 has an open end portion that is similar to the way in which the end 16a of conduit 16 terminates but is located on the opposite side of the vertical center line of Fig. 1. Spaced from and surrounding a part of the first supply tube 16 is a hollow conduit 20 of partial annulus configuration having one end 21 opened to atmospheric pressure and having its other end 22 connected and opening into a hollow spoke portion 23 which in turn has an upper end opening into the aforementioned high pressure chamber 17. Spaced from and surrounding a part of the second tube 18 is a hollow conduit 26 of partial annulus configuration having one end 27 opened to atmospheric pressure and having its other end 28 connected and opening into a hollow spoke, not shown in the drawing, which spoke in turn opens into the aforementioned low pressure chamber 19.

Within the hollow conduit 20 and surrounding the exterior of the first supply tube 16 is shown a pool of liquid 24 in Fig. 2 of the drawing, which could very well be mercury. The right and left levels of this liquid are shown in this figure and these are displaced in the same relative manner as the levels of a liquid 25 and the ring balance 15.

In a manner similar to that of supply tube 16 already described and as shown in Fig. 2, the second supply tube 18 has also spaced therefrom, the hollow conduit 26 wherein a pool of mercury, similar to that shown at 24 for hollow conduit 20, is placed. The liquid placed in either of these hollow conduits 20, 26 is used as a movable seal to seal off the respective high and low fluid pressures flowing out of the open end of the fixed conduits 16 and 18 which are above the pool of liquid in hollow conduits 20 and 26.

The outer ring 15 and the liquid 25 therein functions in the normal manner of the prior art ring balances to rotate the ring about its supporting axis in accordance with the difference in the fluid heads in the left and right chambers 19 and 17 respectively of the ring 15. The differences in the heads are produced by the differences in the static pressures supplied thereto by way of the novel pressure seal of the present invention from conduits 12 and 13.

As viewed in Fig. 2, the ring 20 has the supply tube 16 entering at 21 and passing through the fluid 24 to be in communication with the chamber 17 of ring 15. The pressure condition will cause the liquid 24 to be displaced in the annulus or ring 20 to create an unbalance force which will be in the same direction as the force created by liquid 25 in the ring 15. A similar action will take place in the annulus or ring 26 with the fluid being displaced in a manner tending to exert a force in the overall system. This force will be in a direction opposite that from ring 20 but its magnitude will be less. This is due to the fact that the liquid displacement in ring seal 20 is displaced by a larger pressure signal than that displacing the liquid in ring seal 26. Consequently, there will be a net force in the seal of the apparatus tending to aid the unbalance signal in the ring 15. The combined reaction of all of these fluids to a change in differential pressure is such as to rotate the entire assembly including front spokes 29, 30, 31 fixedly attached to the hollow conduit 20, the ring balance 15, the hub 32, the rear spokes 33, 34 and one other similar spoke, not shown in the drawing, fixedly attached to the hollow conduit 26 and hub 35, on their respective knife edges 36, 37 as a single unit. Fig. 1 of the drawing suggests an appropriate knife edge supporting means 38 cooperating with the edges 36 and 37 and also a connecting means such as the bolts 39, 40 which may be employed to fixedly connect this supporting means to casing 14.

The present form of pressure seal introduces substantially no resilient loading of the ring and a minimum of frictional loading since the seal is not a direct mechanical one but a liquid seal. Such an arrangement greatly enhances the sensitivity that may be expected from the apparatus without deterring the angular rotary movement of the ring balance.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. An improvement in connecting pressure lines to a pivoted ring balance manometer comprising a first hollow annulus, a low and high pressure chamber separated by a liquid in said annulus, a hollow partial annulus concentrically mounted on said first annulus, said partial annulus having one end open to atmosphere, and its other end connected to said low pressure chamber of said first annulus by way of a hollow spoke portion, a stationary conduit within and spaced from the inner walls of said hollow partial annulus, a pool of liquid between the said partial annulus and said stationary conduit, said stationary conduit having one end fixedly connected to a low pressure source and having its other end opening into the end portion of said partial annulus that is connected to the low pressure chamber, a second partial annulus concentrically mounted on said first annulus, said second partial annulus having one end open to atmosphere and its other end connected to said high pressure chamber of said first hollow annulus by way of a second hollow spoke portion, another stationary conduit within and spaced from the inner walls of said second partial annulus, a pool of liquid between said second partial annulus and said latter mentioned stationary conduit and said latter mentioned stationary conduit having one end fixedly connected to a high pressure source and having its other end opening into the said end portion of said last mentioned annulus that is connected to said high pressure chamber.

2. The combination of a pivoted ring balance manometer and a means to decrease the detrimental restricting effects that the low and high pressure supply conduits of said manometer have on said manometer motion, said combination comprising a manometer having a high and low pressure chamber separated by a liquid, two hollow conduits of a partial annulus configuration concentrically mounted on opposing sides of said ring manometer and each having an end open to atmospheric pressure, said other end of one of said conduits being connected by way of a hollow spoke portion to said low pressure chamber of said ring balance manometer and said other end of said other of said conduits being connected to the high pressure chamber of said ring balance manometer by way of a second hollow spoke portion, a first stationary low fluid pressure supply conduit having an end portion opening into and spaced from the inner wall of the said hollow conduit connected to said low pressure chamber, a second stationary high fluid pressure supply conduit having an end portion opening into and spaced from the inner wall of the hollow conduit connected to said high pressure chamber, a first fluid between the outer peripheral surface of the end portion of said first stationary conduit and a portion of said inner wall of said hollow conduit connected to said low pressure chamber and a second fluid between the peripheral surface of the end portion of said second stationary conduit and a portion of said inner wall of said hollow conduit connected to said high pressure chamber.

3. A pressure actuated fluid seal for transmitting a high and low fluid pressure signal to a ring balance manometer comprising, a pivoted annulus having a high and low pressure chamber, a liquid separating said high pressure chamber from said low pressure chamber, two conduits concentrically mounted on opposite sides of said annulus, said conduits each being of a partial annulus configuration opened at one end to atmosphere, said other end of one of said conduits being connected to portion of said annulus above one surface of said liquid by way of a hollow spoke portion and said other end of the other of said conduits being connected to a portion of the said annulus above the remaining surface of said liquid by way of a second hollow spoke portion, a stationary fluid pressure signal connection within and spaced from the inner wall of each of said conduits, said conduits being oscillatable about an axis on which said annulus is rotatably mounted and a sealing pool of liquid between a portion of each of said connections and their associated conduit.

4. An improvement in connecting a differential fluid pressure to a pivotally mounted ring balance manometer comprising, a first segmented annular ring-shaped conduit concentrically mounted on said ring balance manometer, said first conduit being connected at one end to a high pressure chamber in said ring manometer balance by way of a hollow spoke portion, a second segmented annular ring-shaped conduit concentrically mounted on said ring balance manometer, said second conduit having a hollow spoke portion fixedly connected to a low pressure chamber in said ring balance manometer by way of a second hollow spoke portion, a liquid in said manometer separating said high and low pressure chambers, a first stationary high pressure connection inside and spaced from the said conduit connected to said high pressure chamber and a second stationary low pressure connection inside and spaced from the said conduit connected to said low pressure chamber, a liquid between the exterior of each of said pressure connections and the interior wall of the lowest portion of said conduit that surrounds each connection and the end of said first pressure connection being so positioned in the said first conduit that the fluid pressure flowing therefrom will act on one surface of said liquid in said first conduit to displace the liquid therein in accordance with the magnitude of said high pressure while said low fluid pressure flowing from said second connection is acting on another surface of said liquid in said second conduit to displace the liquid therein in accordance with the magnitude of said low pressure.

5. A ring balance manometer comprising, a closed oscillatory hollow torus, having a high and low pressure chamber, a liquid separating said high pressure chamber from said low pressure chamber, a pair of partial annulus conduits concentrically mounted on opposite sides of said torus, each of said conduits being connected at one end to the interior of said torus by way of a hollow spoke portion and having each of their other ends exhausting to atmospheric pressure, a first stationary high pressure transmitting connection passing into one of said open ends of one of said conduits and through a portion of its interior, a second stationary low pressure transmitting connection passing into one of said open ends of the other of said conduits and through a portion of its interior, a fluid in a portion of each of said conduits, said fluid being located at a position in which it surrounds a part of each of said connections and in which it is spaced from the end of each of the connections in each conduit and said fluid in said conduits being displaced in each of said conduits by a change in magnitude of the fluid pressure supplied through said high and low connections and said displaced fluid tending to rotate said conduit.

6. An improvement in connecting a differential pressure to a ring balance manometer comprising, a pivoted annulus having a high and low pressure chamber, a liquid separating said high pressure chamber from said low pressure chamber, two segmented annular ring-shaped conduits concentrically mounted on said annulus, said conduits being connected respectively to the high and low pressure chambers of the interior of said annulus by way of a hollow spoke portion, a stationary low and high pressure connection passing through an interior portion of and being spaced from each of said conduits, a movable liquid seal between the exterior of each connection and the interior of the lowest portion of its associated conduit, said movable liquid seal acting to adjustably lock in said pressures in an upper portion of each of said ring-shaped conduits and in the annulus pressure chamber that is associated with each of these upper portions and the end of said pressure connections being so positioned with respect to said liquid that said pressures present in said high and low pressure connections acting on a surface of each of said movable liquid seals provides a modified displacement force on said balance.

References Cited in the file of this patent

UNITED STATES PATENTS

| | | |
|---|---|---|
| 1,700,204 | Lomer | Jan. 29, 1929 |

FOREIGN PATENTS

| | | |
|---|---|---|
| 380,090 | Great Britain | Sept. 9, 1932 |
| 235,064 | Switzerland | Mar. 1, 1945 |
| 378,206 | Italy | June 25, 1940 |